Figure 7:
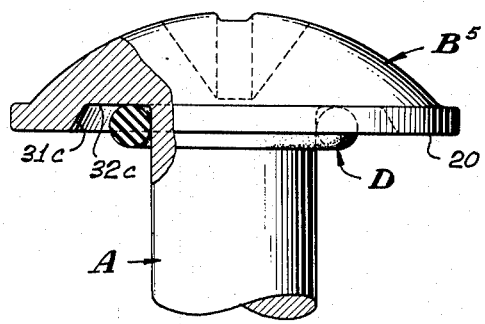

July 3, 1956
J. A. IAIA
2,752,814
CONICAL HEADED FASTENER HAVING ANNULAR
SEALING MEANS POSITIONED IN SAID HEAD
Filed June 9, 1954
2 Sheets-Sheet 1
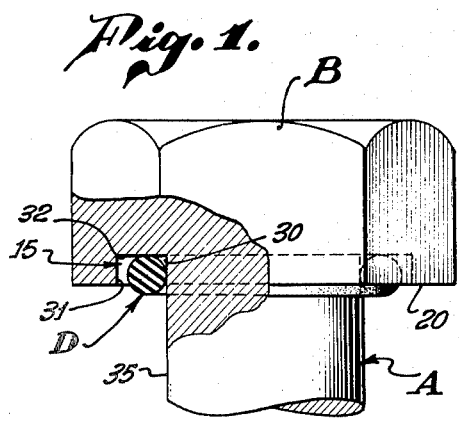
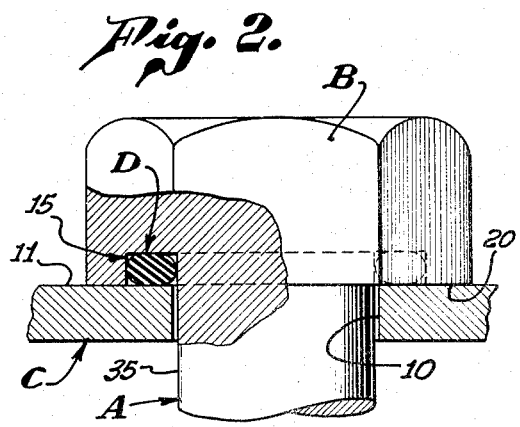
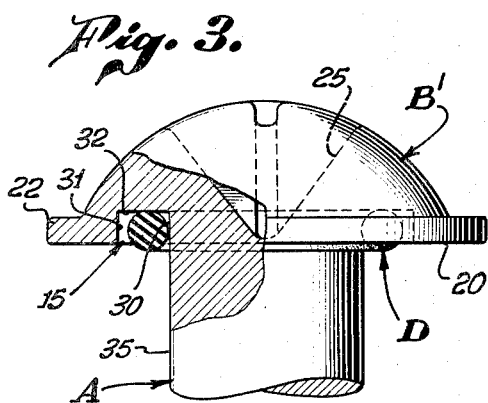
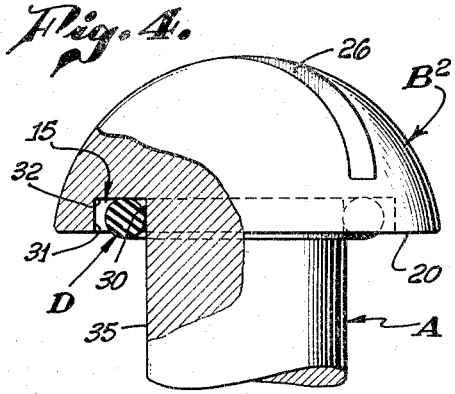
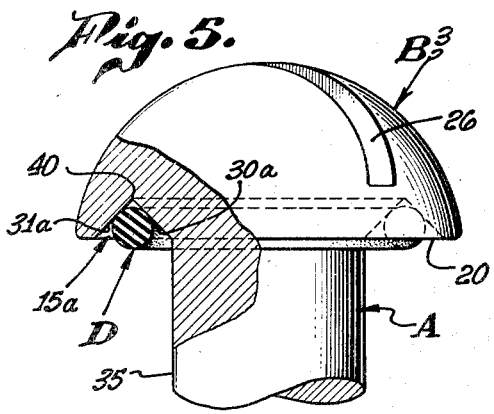
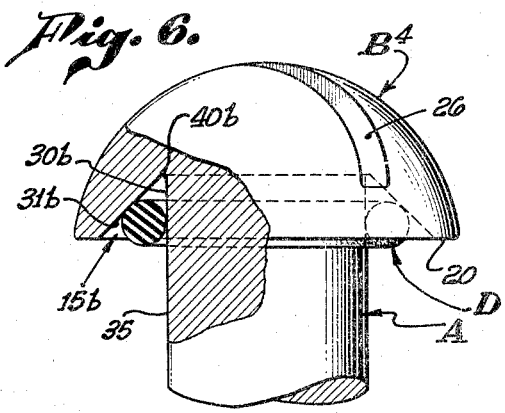
INVENTOR.
JOSEPH A. IAIA,
BY
*W. Hucfell*
ATTORNEY.

July 3, 1956

J. A. IAIA 2,752,814

CONICAL HEADED FASTENER HAVING ANNULAR
SEALING MEANS POSITIONED IN SAID HEAD

Filed June 9, 1954

2 Sheets-Sheet 2

INVENTOR.
JOSEPH A. IAIA,
BY

AGENT.

United States Patent Office 2,752,814
Patented July 3, 1956

2,752,814
CONICAL HEADED FASTENER HAVING ANNULAR SEALING MEANS POSITIONED IN SAID HEAD

Joseph A. Iaia, Los Angeles, Calif.

Application June 9, 1954, Serial No. 435,407

1 Claim. (Cl. 85—9)

This invention has to do with a fastener, and it is a general object of the invention to provide a fastener characterized by an elongate shank with a head thereon and with a sealing means serving to provide an effective, dependable seal between the fastener and an element engaged thereby.

This application is a continuation in part of my application for Letters Patent S. N. 347,377 entitled "Fastener," filed on April 7, 1953, and now abandoned.

Headed fasteners, such as rivets, bolts, screws, etc., are commonly applied to work, for instance, to apertured elements, and it is not uncommon to provide a sealing means to serve as a seal between the fastener and the apertured element. In many instances the sealing means employed in such a situation is a simple washer of sealing or packing material and in many instances rings of packing or sealing material have been combined with rigid folders or carriers. In general, the sealing means commonly employed in situations such as have been referred to are in the nature of washers or inserts applied between the head of the fastener and the element secured thereby and their action generally is that characteristic of an ordinary washer.

It is an object of this invention to provide a headed fastener having combined therewith a sealing ring that serves to effectively seal between the fastener and an element engaged thereby while the head of the fastener directly engages or seats upon the said element.

It is a further object of this invention to provide a fastener of the general character referred to wherein the sealing means or element is in the nature of a simple, continuous ring round in cross-section and acting when in service in the manner characteristic of that type of seal commonly known or referred to as an O-ring.

It is another object of this invention to provide a fastener of the general character referred to wherein the head of the fastener is recessed or provided with an annular channel that carries the sealing ring and which is so related to the sealing ring as to fully receive it when the fastener is applied, the ring being such that when it is in service it is somewhat distorted or under compression establishing pressure sealing engagement with the head of the fastener and with the element engaged by the fastener.

Another object of this invention is to provide a fastener of the general character referred to wherein the head of the fastener is channeled providing a plurality of walls within the head adapted to be engaged by a sealing ring so that the ring when in service has pressure sealing engagement with the head of the fastener at a plurality of spaced points while having pressure sealing engagement with the element engaged by the fastener continuously around the shank of the fastener.

It is another object of this invention to provide a fastener of the general character referred to wherein the channel provided in the head of the fastener is located adjacent the shank of the fastener and is so formed as to adequately accommodate an effective sealing ring without appreciably weakening the head of the fastener.

It is a further object of this invention to provide a fastener of the general character referred to characterized by a head with an annular face or gripping part spaced outward from the shank of the fastener to bear on an element engaged by the fastener at a point removed from the aperture passing the fastener while the seal of the fastener acts continuously around the shank of the fastener and adjacent thereto.

Figure 8:
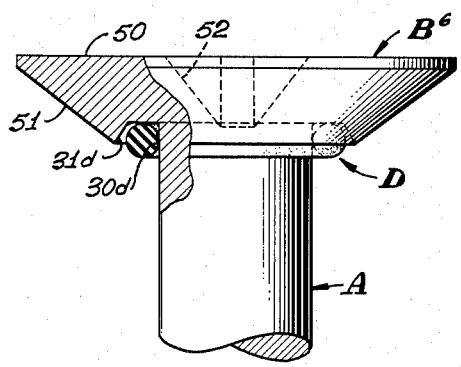
Figure 9:
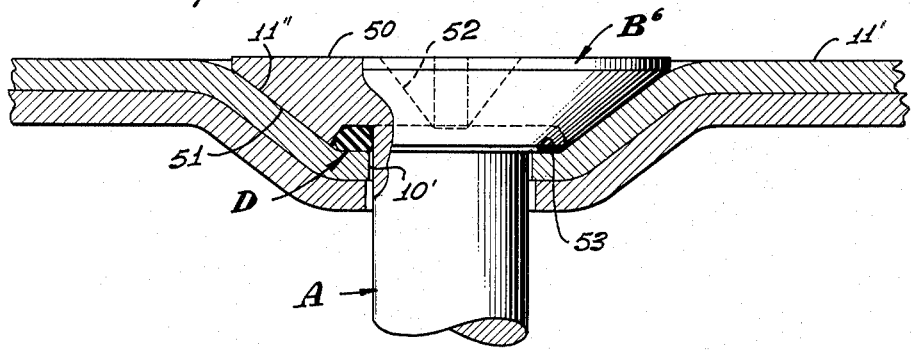

The various objects and features of my invention will be fully understood from the following detailed description of typical preferred forms and applications of my invention, throughout which description reference is made to the accompanying drawings, in which:

Fig. 1 is a side elevation of a fastener embodying the present invention showing the shank and head of the fastener with the sealing means related thereto and with a portion of the structure broken away to illustrate details of construction. Fig. 2 is a view similar to Fig. 1 showing the shank of the fastener engaged through the aperture of an element with which the fastener is related and showing the sealing means acting to seal between the head of the fastener and the said element. Fig. 3 is a view similar to Fig. 1 illustrating a fastener having a head of a type somewhat different from that shown in Figs. 1 and 2. Fig. 4 is a view similar to Figs. 1 and 3 illustrating another form of head. Fig. 5 is a view similar to Figs. 1, 3 and 4 illustrating a head of the type shown in Fig. 4 and showing a form of construction somewhat different from that illustrated in Figs. 1 to 4 inclusive. Fig. 6 is a view similar to Figs. 1, 3, 4 and 5 showing a form of construction somewhat different from that illustrated in Figs. 1 to 4 inclusive and in Fig. 5. Fig. 7 is a view similar to Fig. 1 showing a modified form of the invention. Fig. 8 is a view similar to Fig. 1 showing the invention embodied in a flat-head screw construction, and Fig. 9 is a view similar to Fig. 2 showing the embodiment illustrated in Fig. 7 as applied to a structure having a countersunk hole therein.

The fastener provided with or embodying the present invention may be considered generally as a bolt, screw, or rivet type fastener since it is characterized generally by an elongate shank A and an enlargement or head B on one end of the shank. So far as the other end of the shank is concerned, it has no bearing upon the present invention and varies widely in form or character, for instance, when the fastener is in the nature of a bolt it may be threaded to receive a nut, whereas when the fastener is in the nature of a screw it may be threaded characteristic of a screw, and when it is in the nature of a rivet it may be headed over or of such character as to be readily headed over, etc. Because of the possible wide variation in the shank end remote from that carrying the head B, that portion of the shank has been omitted from the drawings.

The fastener as provided by the present invention is intended to be used in connection with various elements of work, and for the purpose of illustration, only the fastener is shown related to an element C which is in the nature of an apertured plate, the shank A of the fastener being shown in Fig. 2 engaged through the aperture 10 of element C. Considering the element C in a general way, it is contemplated by the invention that it have an aperture 10 or other like or corresponding features of construction for the reception of the shank of the fastener and that it have a shoulder, face, or other like surface 11 adapted to receive the head B of the fastener.

The present invention provides as an element of the structure a sealing means D adapted to serve or seal between the fastener and the element C when these parts are related as illustrated in Fig. 2 of the drawings, and in accordance with the invention, the sealing means D is formed by or provides a continuous annular body of sealing material in the nature of a ring formed of a suitable sealing material, say, for instance, rubber or a rubber-like composition and preferably round in cross-sectional configuration. The invention provides a channel 15 in the head B of the fastener, and the sealing ring of means D is accommodated in the channel 15 to be under compression therein when the fastener is engaged with the element C as shown in Fig. 2 of the drawings.

The shank A of the fastener may not only vary as to features of construction occurring at the portion remote from the head B, but it may, in practice, vary widely in form and extent. In the drawings, the shank A is shown as a simple, straight shank round in cross-section, and the head B is shown as integral with or in the nature of an enlargement on one end of the shank.

The head B may, in practice, vary widely in form, type or construction, and in the drawings and for the purpose of illustration, heads of several different forms or types are illustrated. In Figs. 1 and 2, the head B is shown as a simple polygonal part, for instance, as a hexagonal head such as is commonly found on bolts, screws, etc. The head B, as shown in Figs. 1 and 2, is characterized by a flat end surface 20, occurring in a plane normal to the longitudinal axis of the shank A, and it is this face of the head that opposes the element C and which may be engaged with the element C as shown in Fig. 2 of the drawings.

In the case illustrated in Fig. 3 of the drawings, the head B¹ is rounded or dome-shaped instead of being polygonal and flat topped as shown in Figs. 1 and 2. In Fig. 3, the particular rounded or dome-shaped head is provided at its outer portion or periphery with a flange-like extension 22, and the face 20 of the head extends to the periphery or outer extremity of the flange 22. A tool receiving socket or opening 25 is provided in the head B¹.

In the case of the head B², illustrated in Fig. 4 of the drawings, the head is rounded, or dome-shaped, similar to the construction shown in Fig. 3 except that it is without the peripheral flange. In Fig. 4, the head is shown with a transverse tool receiving slot 26.

In the case of the heads B³ and B⁴ illustrated in Figs. 5 and 6, respectively, the form or shape of head corresponds to that illustrated in Fig. 4.

In the case illustrated in Fig. 7 of the drawings, the head B⁵ is of the same configuration as the head B¹ above described. However, the form of sealing ring and channel, in this case, is modified in respect to the outer wall. As shown, the outer wall 31ᶜ is downwardly and outwardly pitched or inclined, and the vertical extent of the channel is somewhat reduced while the bottom wall 32ᶜ is substantially wider than in the form of the invention above referred to. This channel configuration is particularly adapted to the shape of head shown in Fig. 7, which is somewhat flattened or of limited vertical extent. It will be readily understood how the sealing means D will conform to the configuration of the channel to provide an adequate seal.

All of the heads above referred to are characterized by flat downwardly disposed faces. For example, the face 20. However, as illustrated clearly in Figs. 8 and 9 of the drawings, the downwardly disposed face of the head may be pitched or inclined. In the latter form of the invention the head B⁶ has a flat horizontally disposed top 50 normal to the longitudinal axis of the fastener and a frusto-conical or inclined end surface 51 that tapers downwardly and inwardly from the outer periphery of the top 50. A tool receiving socket or opening 52 is provided in the head B⁵ as shown. As shown, the inner wall 30ᵈ is a continuation of the shank A while the outer wall 31ᵈ is pitched or inclined in the manner above referred to in connection with the form of the invention shown in Fig. 7 of the drawings. In this case the workpiece, when the parts of the fastener are related as shown in Fig. 9, is dimpled or countersunk and the top 50 of the fastener is flush with the surface 11'. In accordance with this form of the invention the countersink in the element C' is provided with a flat annular center portion 53 in a plane normal to the axis of the fastener. The sealing means D will conform to the configuration of the channel and is compressed against the portion 53 providing a seal.

From the figures of the drawings and from the matters hereinabove pointed out, it is to be understood that so far as the present invention is concerned the fastener head may be varied widely in size, shape, form or type, and in general it is merely necessary that it be of such size, shape and form as to stand the service to be incurred and that it have a face such as the face 20 or face 51 to oppose the element C which is to be engaged, while having sufficient size or mass to accommodate the channel 15 required to receive the sealing ring D.

One form of sealing ring and channel construction is illustrated in Figs. 1 to 4 inclusive, and in this case the channel 15, provided in the head of the fastener to receive the sealing ring D, is characterized by inner and outer walls 30 and 31, respectively, and by a bottom wall 32.

In the preferred construction, the channel 15 is formed so that it is adjacent the exterior of the shank A, that is, so that it extends into or enters the head from a point where the head joins the shank. In the case under consideration, the inner wall 30 of the channel is a side wall of the channel, annular in form and of the same diameter as the shank A, and it extends into the head of the fastener from where the shank joins the head so that it is, in effect, a continuation of the outer wall 35 of the shank.

The outer wall 31 of the channel is annular in form, substantially larger in diameter than the inner wall 30 and is concentric therewith. The wall 31 enters the head of the fastener from the face 20 thereof, and in the case under consideration it is cylindrically formed so that it extends into the head parallel with the longitudinal axis of the fastener or shank A.

In the form of the invention under consideration, the inner and outer walls 30 and 31 of the channel 15 are of corresponding extent or depth in that they extend equal amounts into the head, and the bottom 32 of the channel may be somewhat curved or cup-shaped or it may be flat. In the case illustrated the bottom is shown as a flat wall connecting or extending between the walls 30 and 31 and occurs in a plane normal to the longitudinal axis of the shank.

The particular channel 15 thus described includes three related walls, the inner wall 30, the outer wall 31 and the bottom wall 32. These parts are related so that the channel is substantially rectangular in cross-sectional configuration. However, it is to be understood that the outer wall of the channel may be pitched or inclined as above described in accordance with the invention as illustrated in Figs. 7, 8 and 9 of the drawings.

The sealing ring D, in the preferred form of the invention, is a continuous annular ring of suitable sealing material, say, for example, rubber or a rubber-like composition, and it is round in cross-sectional configuration, and it is such that when it is initially engaged in the channel 15, as shown in Fig. 1, it fits into the channel 15 to engage the bottom 32 thereof while contacting the inner wall 30 thereof. The ring may, in practice, be related to the shank and to the inner wall 30 of the channel 15 so that there is enough engagement between these parts to prevent the ring from leaving the channel or the shank unless it is deliberately removed.

The cross-section of the sealing ring D is of such diameter that when the ring is freely engaged in the channel, as shown in Fig. 1, it projects somewhat from the channel or from the face 20 of the head of the fastener thus establishing a projecting part which engages the element C as the fastener is applied thereto before the head of the fastener engages such element.

With the proportioning or relationship of parts just referred to, when the head of the fastener is applied to an element, such as the element C shown in Fig. 2, to seat the face 20 of the head against the surface 11 of the element C, the sealing ring D is under some compression and is confined in the channel 15. Under this condition the sealing ring has pressure sealing contact with the surface 11 of element C where the ring is flattened somewhat against element C, and it has pressure sealing engagement with walls of the channel 15 preferably with each of the walls thereof where it is somewhat flattened as shown in Fig. 2 of the drawings.

With the head of the fastener channeled as hereinabove described, the face 20 of the head is removed or eliminated adjacent the shank A with the result that the face 20, engageable with the element C, is an annular part concentric with shank A considerably larger in diameter than the shank A and spaced therefrom as illustrated in the drawings. As a result of this formation or construction, as the fastener is made tight by whatever means is provided for acting on shank A to bring the face 20 into pressure engagement with element C, the engagement of the head with element C is an annular engagement, spaced from the shank and from the aperture 10 in the element C and results in a stable, effective gripping engagement between the head and the element C, and this action is in no way disturbed or impaired by a slight burring or deflection of element C such as may occur at a point such as apertures 10 occur or by what might be comparable to a fillet occurring by the face of the head and the shank 10 such as often occurs in the case of ordinary construction.

In the form of the invention shown in Fig. 5, the channel 15ª, instead of being a channel rectangular in cross-sectional configuration as shown in Figs. 1 to 4 inclusive, is a channel V-shaped in cross-sectional configuration, the channel being characterized by an inner wall 30ª and an outer wall 31ª, but it is without a flat bottom such as the bottom 32 hereinabove described. In this form of the invention, the channel is preferably adjacent the shank A of the fastener, and the inner wall 30ª starts from the point where the shank A joins the head B³ and it extends into the head and radially outward at an angle so that it is inclined or pitched relative to the longitudinal axis of the shank as well as to the face 20 of the head. The outer wall 31ª enters the head from the face 20 at a point spaced radially outward from a shank and it extends into the head and radially inward to be inclined or pitched relative to the axis of the shank as well as to the face 20 in a manner opposite to the pitching of face 30ª. The walls 30ª and 31ª join or come together at a point 40, which may be considered the bottom of the channel.

When the form of construction shown in Fig. 5 is employed, the sealing ring D may be made so that it is of such diameter or size relative to the channel and shank as to engage the walls 30ª and 31ª in like manner, as shown in Fig. 5 or being somewhat spaced from the shank. When the construction shown in Fig. 5 is put into use, the annular sealing ring D is compressed with consequent pressure engagement of the sealing ring against the wall 30ª and 31ª while it has effective sealing engagement with the surface 11 of the element C engaged by the fastener. The construction as shown in Fig. 5 provides for sealing engagement of the ring D with but two walls of the channel as distinguished from engagement with three walls as in the case first described.

In the case of the construction illustrated in Fig. 6 of the drawings, the channel 15ᵇ is similar generally to that shown in Fig. 5 in that it is V-shaped in cross-sectional configuration; however, a V-shaped channel is gained by a construction that varies somewhat from that shown in Fig. 5. In the structure shown in Fig. 6, the inner wall 30ᵇ of the channel 15ᵇ is annular in form and straight or parallel with the longitudinal axis of the shank so that it is, in effect, a continuation of the outer wall 35 of the shank as is the case of the inner wall 30 in the form of the invention first described. In the structure shown in Fig. 6, the outer wall 31ᵇ of the channel is pitched or inclined as is the wall 31ª of the construction shown in Fig. 5 and it continues into the head and radially inward until it meets or intersects the wall 30ᵇ at the point 40ᵇ.

In the case of the construction shown in Fig. 6, the sealing ring D is related to the shank of the fastener as is the sealing ring shown in Figs. 1 to 4, and it is related to the walls 30ᵇ and 31ᵇ of the channel 15ᵇ so that when the fastener is applied to a support C, the ring is compressed and has pressure sealing engagement not only with the surface 11 of element C but also with wall 30ᵇ and wall 31ᵇ of the groove.

In the case of the construction shown in Figs. 7, 8 and 9 the sealing ring D is related to the fastener and element C or C' in the same manner as above described. By providing an inclined outer wall, the channel presents diverging side walls to the end that the sealing ring D is not pinched and is not extruded from the channel to become caught between the end face of the fastener and the element C or C'.

Having described only a typical preferred form and application of my invention, I do not wish to be limited or restricted to the specific details herein set forth, but wish to reserve to myself any variations or modifications that may appear to those skilled in the art and fall within the scope of the following claim.

Having described my invention, I claim:

A fastener comprising an elongate shank, a head on the shank at one end thereof and integral therewith, said head having a downwardly and inwardly inclined frusto-conical element-engaging face concentric with the axis of said shank, the bottom surface of said head being provided with a channel having a flat bottom concentric with the axis of said shank, the innermost wall of said channel being formed by the periphery of said shank and the outermost wall of said channel being inclined downwardly and outwardly from the axis of said shank, and a flexible O-ring having a cross-sectional diameter larger than the depth of said channel and smaller than the width of said channel, said O-ring adapted for compression within said channel when the shank of said fastener is secured within an aperture of an element surface and the face of said fastener is in engagement with the surface of the element about said aperture.

References Cited in the file of this patent

UNITED STATES PATENTS

| | | |
|---|---|---|
| 316,619 | Hayes | Apr. 28, 1885 |
| 951,437 | Gehrke | Mar. 8, 1910 |
| 1,254,514 | Lehmann | Jan. 22, 1918 |
| 2,207,476 | Bernstein | July 9, 1940 |
| 2,250,343 | Zigler | July 22, 1941 |
| 2,381,829 | Livers | Aug. 7, 1945 |
| 2,396,005 | Gross et al. | Mar. 5, 1946 |
| 2,462,023 | Johanson et al. | Feb. 15, 1949 |
| 2,476,074 | Unger | July 12, 1949 |
| 2,531,048 | Huck | Nov. 21, 1950 |

FOREIGN PATENTS

| | | |
|---|---|---|
| 673,953 | Great Britain | June 18, 1952 |
| 685,966 | Great Britain | Jan. 14, 1953 |